US009934821B2

(12) United States Patent
Oguchi et al.

(10) Patent No.: US 9,934,821 B2
(45) Date of Patent: Apr. 3, 2018

(54) NON-TRANSITORY COMPUTER-READABLE STORAGE MEDIUM, PLAYBACK CONTROL METHOD, AND PLAYBACK CONTROL DEVICE

(71) Applicant: FUJITSU LIMITED, Kawasaki-shi, Kanagawa (JP)

(72) Inventors: Atsushi Oguchi, Kawasaki (JP); Manabu Sakaguchi, Yokohama (JP); Tomohiro Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/438,035

(22) Filed: Feb. 21, 2017

(65) Prior Publication Data
US 2017/0249972 A1  Aug. 31, 2017

(30) Foreign Application Priority Data
Feb. 29, 2016  (JP) ................................. 2016-037788

(51) Int. Cl.
*H04N 5/93* (2006.01)
*G11B 27/10* (2006.01)
(Continued)

(52) U.S. Cl.
CPC .......... *G11B 27/105* (2013.01); *G11B 27/005* (2013.01); *G11B 27/031* (2013.01); *G11B 27/309* (2013.01); *G11B 27/3036* (2013.01)

(58) Field of Classification Search
CPC . G11B 27/105; G11B 27/3036; G11B 27/309; G11B 27/031; G11B 27/005
(Continued)

(56) References Cited

U.S. PATENT DOCUMENTS 9,298,986 B2 *  3/2016  Ferlatte .............. G06K 9/00724
2004/0125877 A1  7/2004  Chang et al.
(Continued)

FOREIGN PATENT DOCUMENTS

JP      2003-309799 A     10/2003
JP      2005-295296 A     10/2005
(Continued)

OTHER PUBLICATIONS

Office Action dated Sep. 29, 2017, issued in counterpart Taiwanese Application No. 106105224, with English translation (12 pages).
(Continued)

*Primary Examiner* — Robert Chevalier
(74) *Attorney, Agent, or Firm* — Westerman, Hattori, Daniels & Adrian, LLP

(57) ABSTRACT

A non-transitory computer-readable storage medium storing a playback control program that causes a computer to perform a process, the process including specifying a plurality of partial videos extracted from a sport video, each of the plurality of partial videos being associated with information indicating a playback start positions and information on a content of sports play indicated by each of the plurality of partial videos, determining a plurality of playback times from the playback start position for each of the plurality of partial videos based on the information on the content corresponding to each of the plurality of partial videos and based on relation information that associates each of a plurality of contents of sports play with playback times, and playing back the plurality of partial videos based on the plurality of determined playback times.

10 Claims, 11 Drawing Sheets

(51) Int. Cl.
*G11B 27/30* (2006.01)
*G11B 27/031* (2006.01)
*G11B 27/00* (2006.01)

(58) Field of Classification Search
USPC ............... 386/278, 281, 290, 262, 343, 351
See application file for complete search history.

(56) References Cited

U.S. PATENT DOCUMENTS

| | | | |
|---|---|---|---|
| 2009/0019504 A1 | 1/2009 | Huang et al. | |
| 2010/0252998 A1* | 10/2010 | Guidroz | A63F 3/0615 273/292 |
| 2013/0325869 A1 | 12/2013 | Reiley et al. | |
| 2016/0042612 A1* | 2/2016 | Scalise | G07F 17/3288 463/25 |

FOREIGN PATENT DOCUMENTS

| | | |
|---|---|---|
| JP | 2007-335984 A | 12/2007 |
| TW | 200904193 A | 1/2009 |

OTHER PUBLICATIONS

Office Action dated Oct. 25, 2017, issued in counterpart Korean Application No. 10-2017-0024943, with English translation (15 pages).

\* cited by examiner

FIG. 2

| FILE NAME | PITCHING TAG (FRAME TIME) | GAME DATE | PITCHER | BATTER | RESULT | PITCHING COURSE | TYPE OF PITCH | BATTED BALL DIRECTION | BALL COUNT | RUNNER | ... |
|---|---|---|---|---|---|---|---|---|---|---|---|
| | ... | | | | | | | | | | |
| 20160410XY | xxx.x | 2016.04.10 | AAAA | BBBB | SWING AND MISS | 25 | CURVE | 0 | (0, 0, 0) | (0, 0, 0) | |
| 20160410XY | xxx.x | 2016.04.10 | AAAA | BBBB | TWO-BASE HIT | 18 | FORK | 8 | (0, 1, 0) | (0, 0, 0) | |
| 20160410XY | xxx.x | 2016.04.10 | AAAA | CCCC | FLY OUT | 16 | FORK | 12 | (0, 0, 0) | (1, 0, 0) | |
| 20160410XY | xxx.x | 2016.04.10 | AAAA | DDDD | CAUGHT LOOKING | 3 | STRAIGHT | 0 | (0, 0, 1) | (1, 0, 0) | |
| | ... | | | | | | | | | | |

| RESULT | PLAYBACK TIME |
|---|---|
| SWING AND MISS | 5 SECONDS |
| CAUGHT LOOKING (STRIKE) | 5 SECONDS |
| CAUGHT LOOKING (BALL) | 5 SECONDS |
| FOUL | 5 SECONDS |
| GROUNDER OUT | 10 SECONDS |
| FLY OUT | 10 SECONDS |
| SINGLE HIT | 10 SECONDS |
| TWO-BASE HIT | 15 SECONDS |
| THREE-BASE HIT | 20 SECONDS |
| HOME RUN | 30 SECONDS |
| ... | |

FIG. 10

| PITCHING TAG (FRAME TIME) | GAME DATE | PITCHER | BATTER | RUNNING ABILITY | ... |
|---|---|---|---|---|---|
| ... | | | | | |
| xxx.x | 2016.04.10 | AAAA | BBBB | FAST | |
| xxx.x | 2016.04.10 | AAAA | BBBB | FAST | |
| xxx.x | 2016.04.10 | AAAA | CCCC | SLOW | |
| xxx.x | 2016.04.10 | AAAA | DDDD | NORMAL | |
| ... | | | | | |

| RESULT | PLAYBACK TIME | | |
| --- | --- | --- | --- |
| | FAST | NORMAL | SLOW |
| ... | | | |
| SINGLE HIT | 8 SECONDS | 10 SECONDS | 12 SECONDS |
| TWO-BASE HIT | 13 SECONDS | 15 SECONDS | 18 SECONDS |
| THREE-BASE HIT | 17 SECONDS | 20 SECONDS | 25 SECONDS |
| ... | | | |

16A

NON-TRANSITORY COMPUTER-READABLE STORAGE MEDIUM, PLAYBACK CONTROL METHOD, AND PLAYBACK CONTROL DEVICE

CROSS-REFERENCE TO RELATED APPLICATION

This application is based upon and claims the benefit of priority of the prior Japanese Patent Application No. 2016-037788, filed on Feb. 29, 2016, the entire contents of which are incorporated herein by reference.

FIELD

The embodiments discussed herein are related to a playback control program, a playback control method, and an information processing device.

BACKGROUND

To date, a proposal has been made of an apparatus that extracts an event end point of a sport video that is subjected to digest viewing. In this apparatus, cut points on and after the event start point are detected from the sport video whose event start point has been determined, and the type of the cut length between the detected cut points is classified in accordance with the length of the cut length. Also, an appearance pattern of the type of the cut length is stored in an appearance pattern storage unit in association with the event end point. The appearance pattern storage unit is then referred to, and an event end point corresponding to the appearance pattern of the classified type is extracted, and the extracted event end point is output.

RELATED ART TECHNICAL DOCUMENT

[Patent Literature]
[Patent Document 1] Japanese Laid-open Patent Publication No. 2007-335984.

SUMMARY

According to an aspect of the invention, a non-transitory computer-readable storage medium storing a playback control program that causes a computer to perform a process, the process including specifying a plurality of partial videos extracted from a sport video, each of the plurality of partial videos being associated with information indicating a playback start positions and information on a content of sports play indicated by each of the plurality of partial videos, determining a plurality of playback times from the playback start position for each of the plurality of partial videos based on the information on the content corresponding to each of the plurality of partial videos and based on relation information that associates each of a plurality of contents of sports play with playback times, and playing back the plurality of partial videos based on the plurality of determined playback times.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of metadata.
FIG. 3 is a diagram illustrating an example of a search and playback screen.
FIG. 5 is a diagram illustrating an example of an association table.
FIG. 10 is a diagram illustrating another example of metadata.
FIG. 11 is a diagram illustrating another example of the association table.

DESCRIPTION OF EMBODIMENTS

According to an aspect of the present disclosure, when a plurality of videos of different sports play are subjected to digest playback, it is desirable to play back each video in a suitable playback time.

In the following, a detailed description will be given of an example of embodiments according to the present disclosure with reference to the drawings. In the present embodiment, a description will be given of the case of playing back a digest of a baseball game video.

Figure 1:
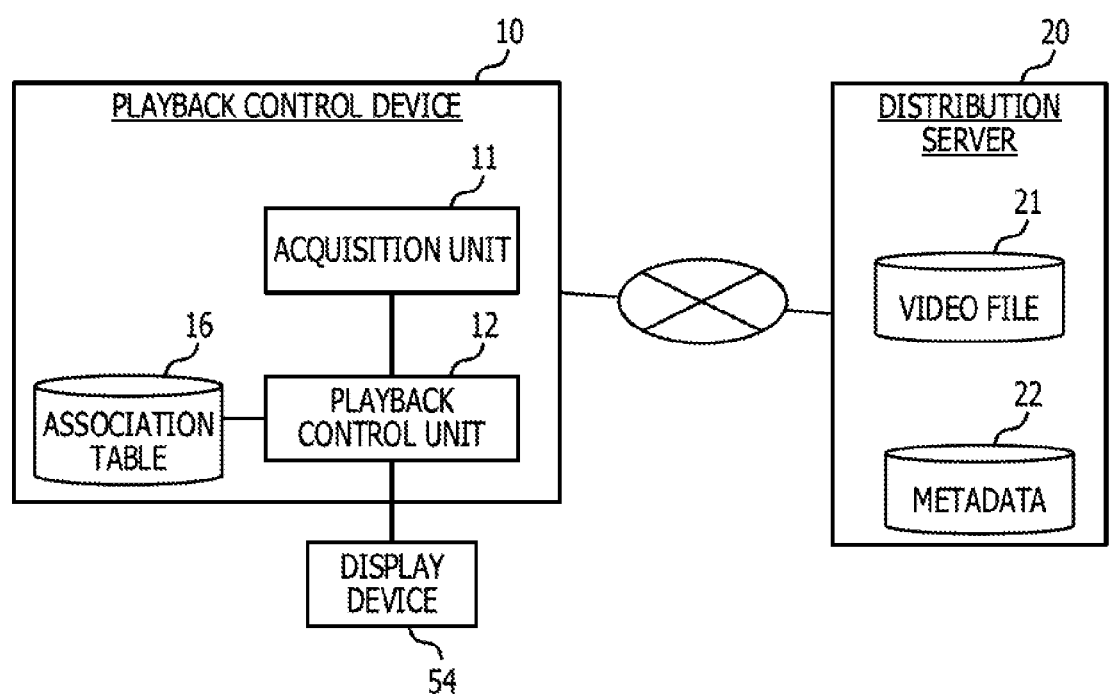
FIG. 1 is a functional block diagram illustrating a schematic configuration of a playback control device according to the present embodiment.

As illustrated in FIG. 1, a playback control device 10 according to the present embodiment is coupled to a distribution server 20 that distributes a baseball game video via a network, or the like, and performs playback control of the video at the time of playing back the video obtained from the distribution server 20 on a display device 54.

The distribution server 20 stores a video file 21 of a video in which a baseball game is captured. In the present embodiment, the video file 21 is created for each game, and each video file 21 is given a file name using a game day of the game and an opposing team name that correspond to the game, or the like so that the video file 21 of each game is uniquely managed in an identifiable state. For example, the video file 21 of a game of team X vs. team Y, which was held on Apr. 10, 2016 is given a file name of "20160410XY".

Also, each video file 21 is a video that is captured at a frame rate of 30 fps, 60 fps, or the like, for example, and includes a plurality of frames. Each frame is associated with a frame time indicated by an elapsed time from the start of capturing video, and this frame time is used as identification information of each frame.

Also, in the video file 21, a point indicating a breakpoint of the play is given the information indicating that the point is a breakpoint of the play. In the present embodiment, a pitching of each one ball by a pitcher is determined to be a breakpoint of a play, and a "pitching tag" is given to a point indicating a start of the pitching by the pitcher. More specifically, a pitching tag is given to a frame corresponding to a time frame before a predetermined time period (for example, before three seconds) from the start place of a pitching action by a pitcher, for example, among the frames included in the video file 21.

Also, the distribution server 20 stores metadata 22. The metadata 22 according to the present embodiment is the information associated with the information regarding a pitching scene indicated by frames between a frame given a pitching tag and a frame to which the next pitching tag is given for each "pitching tag" that is given to the video file 21. In this regard, each pitching scene is an example of a partial video according to the present disclosure.

FIG. 2 illustrates an example of the metadata 22. In the example in FIG. 2, a "file name" for identifying the video file 21, a frame time given a "pitching tag", and information regarding a pitching scene that starts from the frame given the pitching tag are stored in association with one another. The information regarding a pitching scene includes information, such as a "game day", a "pitcher", a "batter", a "result", a "pitching course", a "type of pitch", a "batted ball direction", a "count", a "runner", or the like. The "game day" is a date on which the game including the pitching scene was held. The "pitcher" is information, such as a player ID for identifying a pitcher who performed pitching indicated by the pitching scene, and the information of a player name, or the like. The "batter" is a player ID for identifying a batter at the pitching time indicated by the pitching scene, and the information of the player name, or the like.

The "result" is a result of the batter in the pitching scene, and is, for example, a swing and miss, a caught looking (strike), a caught looking (ball), a foul, a ground out, a fly out, a single hit, a two-base hit, a three-base hit, a home run, or the like. Also, the "pitching course" is a course through which the pitching illustrated in the pitching scene passed. For example, if a strike zone and its peripheral zone are divided into a plurality of blocks, and each block is given a number, it is possible to express the "pitching course" by the block numbers through which the pitching has passed. Also, the "batted ball direction" is a batted ball direction when a batter batted against the pitching illustrated in the pitching scene. For example, if a ground is divided into a plurality of blocks, and each block is given a number, it is possible to express the "batted ball direction" by the block number that the batted ball reached.

Also, the "count" is a combination of numbers of a ball count, a strike count, and an out count, which is expressed in a format of "(ball count, strike count, and out count)" at the time of starting the pitching scene. For example, if the counts are three balls, one strike, and two outs, they are expressed by "(3, 1, 2)". Also, the "runner" is a combination of numbers of the state of runners at the time of starting the pitching scene in a format of "(the presence of a runner on the first base, the presence of a runner on the second base, and the presence of a runner on the third base)". For example, if it is assumed that the presence of a runner is expressed by "1", and absence of a runner is expressed by "0", the case where there is a runner only on the first base is expressed by "(1, 0, 0)".

The playback control device 10 functionally includes an acquisition unit 11 and a playback control unit 12. Also, an association table 16 is stored in a predetermined storage area in the playback control device 10.

The acquisition unit 11 accepts a search condition of a video to be viewed and transmits the accepted search condition to the distribution server 20 so as to request distribution of the video. The acquisition unit 11 then obtains a video file 21 that matches the search condition and the metadata 22 of the video file 21.

Figure 3:
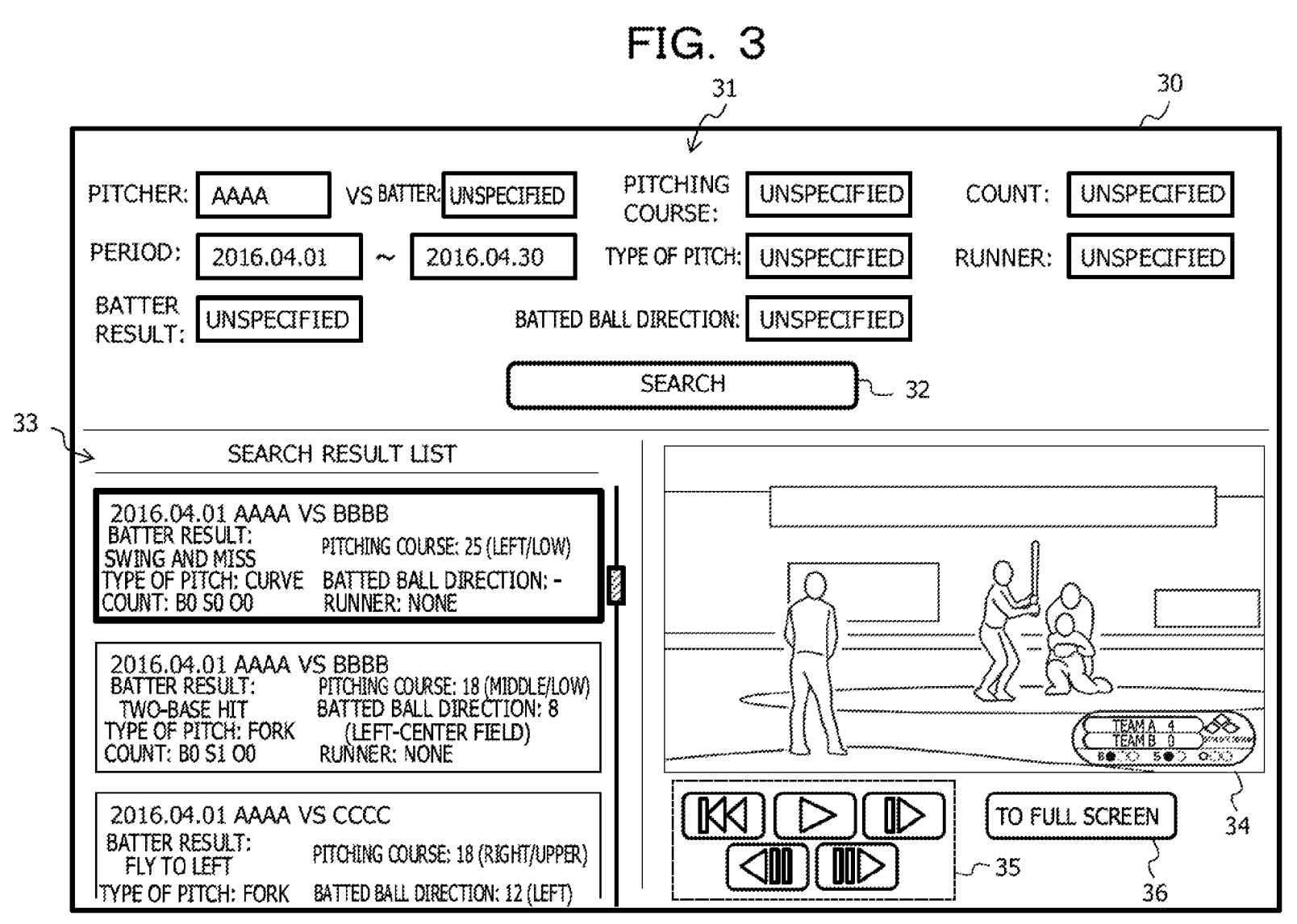

Specifically, the acquisition unit 11 displays a search and playback screen 30 as illustrated in FIG. 3 on the display device 54. In the example in FIG. 3, the search and playback screen 30 includes a search condition specification area 31, a search button 32, a search result list display area 33, a video playback area 34, a playback control button group 35, and a full-screen change button 36.

The search condition specification area 31 includes text boxes for accepting conditions regarding individual items that are allowed to be specified as search conditions, and pull down menus. It is possible to determine each of the items that are allowed to be specified as search conditions as being a corresponding item of the information regarding the pitching scene included in the metadata 22.

When a user selects the search button 32, the acquisition unit 11 transmits the search conditions specified in the search condition specification area 31 to the distribution server 20 so as to request distribution of a video. Thereby, the distribution server 20 identifies a pitching scene that matches the search condition from the metadata 22 using the received search condition as a key. The distribution server 20 then distributes the video file 21 including the identified pitching scene and the metadata 22 of the pitching scene to the playback control device 10.

The acquisition unit 11 acquires the video file 21 and the metadata 22 that are distributed from the distribution server 20. Also, the acquisition unit 11 displays a list of the search results in the search result list display area 33 in a selectable state of each search result based on the acquired metadata 22. In the example in FIG. 3, each search result is displayed in one frame, and information regarding the pitching scene illustrated by the search result is displayed as the search result. Also, the acquisition unit 11 displays the selected search result in a display mode different from those of the other search results. In the example in FIG. 3, the frame line of the selected search result is illustrated by a bold line.

The playback control unit 12 identifies the selected pitching scene from the video file 21 acquired by the acquisition unit 11 based on the metadata 22 corresponding to the selected search result in the search result list display area 33, and plays back the selected pitching scene in the video playback area 34. Specifically, the playback control unit 12 identifies the video file 21 by the "file name" of the metadata 22 corresponding to the selected search result, and plays back the identified video file 21 from the frame indicated by the frame time specified by the "pitching tag" in the metadata 22.

Also, when any one of the buttons is selected from the playback control button group 35, the playback control unit 12 performs playback control on the video being played back in the video playback area 34 in accordance with the selected button. It is possible for the playback control button group 35 to include, for example, a playback/pause button, a fast return button, a fast forward button, a frame advance button, and a frame return button, and the like. If the playback/pause button is selected, the playback control unit 12 pauses the video being played back or performs playback control on the video being paused. Also, if the fast return button is selected, the playback control unit 12 performs fast return control on the video being played back, and if the fast forward button is selected, the playback control unit 12 performs fast forward control on the video being played back. Also, if the frame return button is selected, the playback control unit 12 performs frame return control on the video being played back, and if the frame advance button is selected, the playback control unit 12 performs frame advance control on the video being played back.

Figure 4:
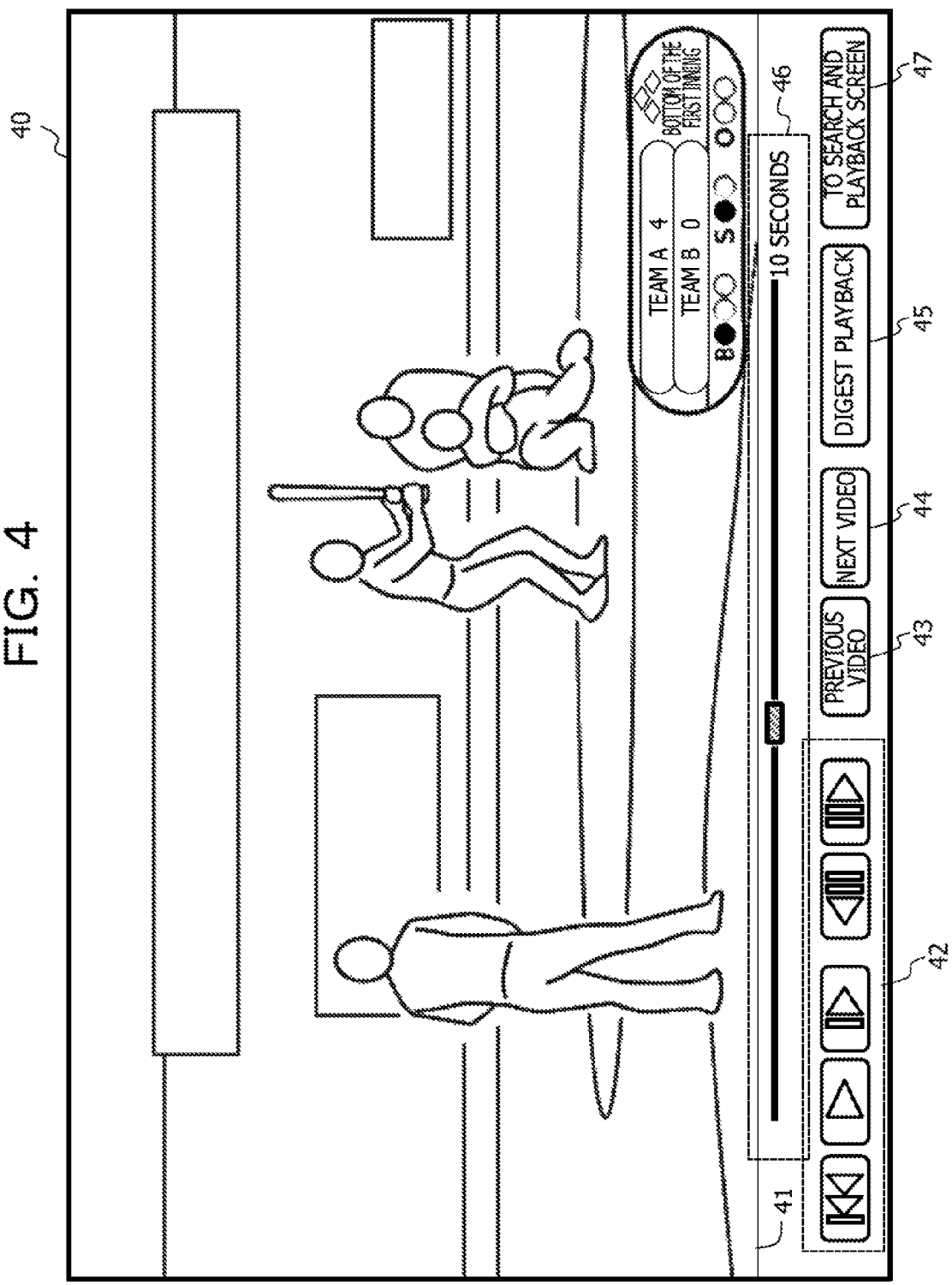
FIG. 4 is a diagram illustrating an example of a full screen display.

Also, if the full-screen change button 36 is selected, the playback control unit 12 changes the screen displayed on the display device 54 from the search and playback screen 30 to, for example the full screen display 40 as illustrated in FIG. 4. In the example in FIG. 4, the full screen display 40 includes a video playback area 41, a playback control button group 42, a previous video button 43, a next video button 44, a digest playback button 45, a playback gauge 46, and a search and playback screen change button 47.

The playback control unit 12 plays back the video of the pitching scene illustrating the search result that is selected in the search result list display area 33 in the search and playback screen 30 in the video playback area 41. The playback method is the same as the playback method of the video in the video playback area 34 in the search and playback screen 30.

Also, if any one of the buttons is selected from the playback control button group 42, the playback control unit 12 performs playback control in accordance with the selected button on the video being played back in the video playback area 41. The details of the playback control button group 42 are the same as those of the playback control button group 35 in the search and playback screen 30.

Also, when the previous video button 43 is selected, the playback control unit 12 changes the video being played back in the video playback area 41 to the video of the pitching scene illustrating the search result that is one before the search result currently selected in the search result list display area 33. In this regard, if the currently selected search result is the beginning search result of the search result list, the previous video button 43 may be hidden, or selection thereof may be disabled. Also, when the next video button 44 is selected, the playback control unit 12 changes the video being played back in the video playback area 41 to the video of the pitching scene illustrating the search result that is one after the search result list currently selected in the search result list display area 33. In this regard, if the currently selected search result is at the end of the search result list, the next video button 44 may be hidden, or selection thereof may be disabled.

Also, when the digest playback button 45 is selected, the playback control unit 12 performs digest playback control in which the videos of the pitching scenes that are individually illustrated by the search results included in the search result list that are displayed in the search result list display area 33 in the search and playback screen 30 are continuously played back. At this time, the playback control unit 12 adjusts the playback time of the video of each pitching scene to the time period in accordance with the information regarding the pitching scene. In the present embodiment, the "result" information is used for the information regarding the pitching scene.

Specifically, the playback control unit 12 obtains the "result" information included in the metadata 22 corresponding to the search result, refers to the association table 16, and obtains the playback time in accordance with the "result". As illustrated in FIG. 5, the association table 16 illustrates an association relationship between the pitching scene result and the playback time of the pitching scene video, for example. When the association table 16 in FIG. 5 is used, for example, if it is assumed that the playback control unit 12 obtains "single hit" as a result from the metadata 22 corresponding to a certain search result, the playback control unit 12 obtains "10 seconds" as the playback time of the pitching scene video illustrated by the search result.

Here, it is possible to set the playback time corresponding to each result in the association table 16 on the assumption of the time taken as a result of each play. For example, the pitching scene becomes longer in the case where the result is a two-base hit than in the case of a single hit, and the pitching scene becomes longer in the case where the result is a three-base hit than in the case of a two-base hit. The playback time may be set in consideration of such a situation. It is possible to obtain a specific playback time statistically from a large number of pitching scenes.

When the playback control unit 12 has played back the pitching scene video indicated by the beginning search result included in the search result list displayed in the search result list display area 33 for the period of the obtained playback time, the playback control unit 12 changes to play back the pitching scene video indicated by the next search result in the search result list. In the same manner for the next video, when the playback control unit 12 has played back the video for the period of the obtained playback time, the playback control unit 12 changes to play back the pitching scene video indicated by the next search result. By repeating this, digest playback of the pitching scene videos for each of the search results included in the search result list is realized. In this regard, the playback of each pitching scene video is performed by identifying a pitching scene corresponding to each search result among the video file 21 transferred from the acquisition unit 11 based on the metadata 22 in the same manner as the above-described playback method, and each pitching scene video is played back in the video playback area 41.

The playback control unit 12 displays the playback gauge 46 that illustrates the playback time of each pitching scene video and the progress of the playback at the time of performing digest playback. In the digest playback, as described above, the playback time of each pitching scene video differs depending on the result of the pitching scene. Thus, this playback gauge 46 enables the user to know the time until the video of the next pitching scene commences. In this regard, in place of the playback gauge 46, the number of seconds until the next video starts may be displayed by being counted down.

Also, if the search and playback screen change button 47 is selected, the playback control unit 12 changes the screen displayed on the display device 54 from the full screen display 40 to the search and playback screen 30.

Figure 6:
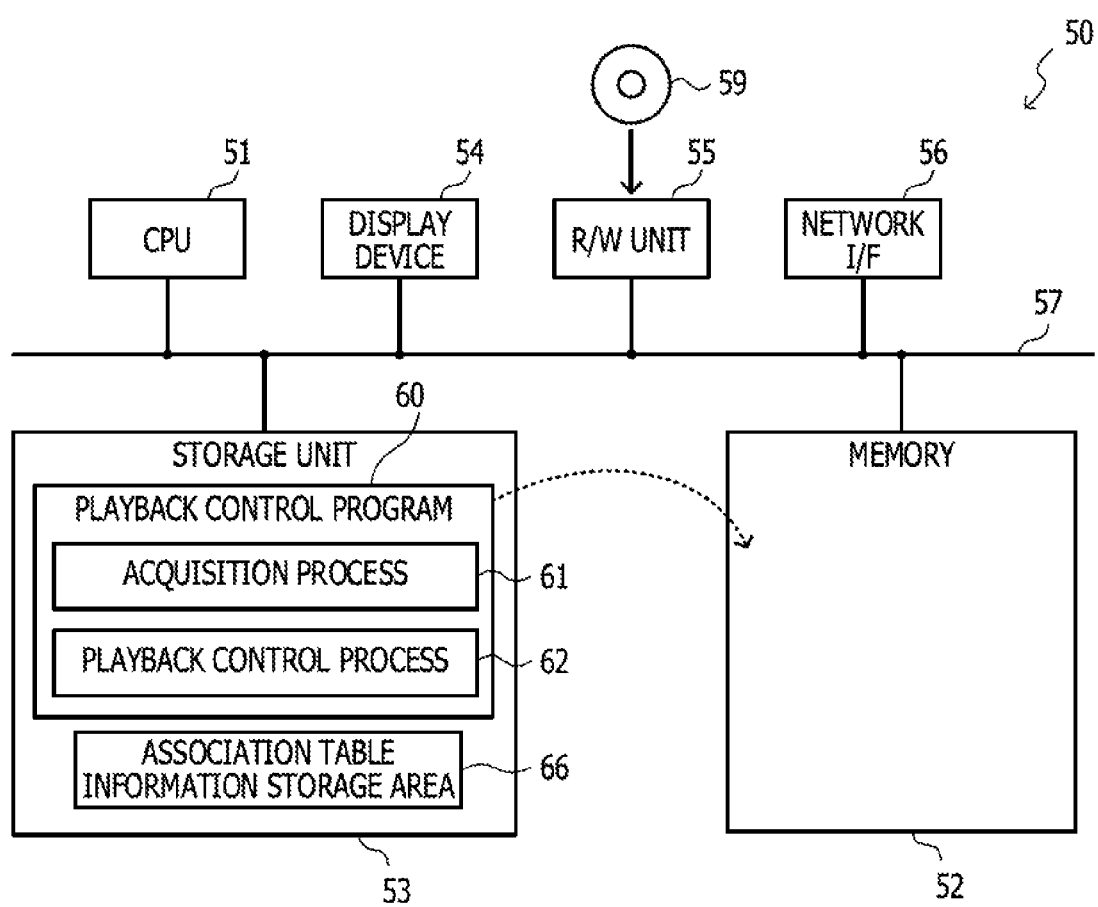
FIG. 6 is a block diagram illustrating a schematic configuration of a computer that functions as the playback control device according to the present embodiment.

It is possible to realize the playback control device 10 by a computer 50 illustrated in FIG. 6, for example. The computer 50 includes a CPU 51, and a memory 52 that serves as a temporary storage area, and a nonvolatile storage unit 53. Also, the computer 50 includes a read/write (R/W) unit 55 that controls reading data from and writing data to a display device 54, and a recording medium 59, and a network interface (I/F) 56 that is coupled to a network, such as the Internet, or the like. The CPU 51, the memory 52, the storage unit 53, the display device 54, the R/W unit 55, and the network I/F 56 are mutually coupled via a bus 57.

It is possible to realize the storage unit 53 by an HDD (Hard Disk Drive), an SSD (solid state drive), a flash memory, or the like. The storage unit 53 as the storage medium stores a playback control program 60 that causes the computer 50 to function as the playback control device 10. The playback control program 60 includes an acquisition process 61, and a playback control process 62. Also, the storage unit 53 includes an association table information storage area 66 in which the information that constitutes the association table 16 is stored.

The CPU 51 reads the playback control program 60 from the storage unit 53, loads the program into the memory 52, and executes the processes possessed by the playback control program 60 in sequence. The CPU 51 executes the acquisition process 61 so as to operate as the acquisition unit 11 illustrated in FIG. 1. Also, the CPU 51 executes the playback control process 62 so as to operate as the playback control unit 12 illustrated in FIG. 1. Also, the CPU 51 reads information from the association table information storage area 66 so as to load the information into the memory 52 as the association table 16. Thereby, the computer 50 that executes the playback control program 60 functions as the playback control device 10.

In this regard, it is possible to realize the functions that are realized by the playback control program 60, for example by a semiconductor integrated circuit, more specifically an Application Specific Integrated Circuit (ASIC), or the like.

Figure 7:
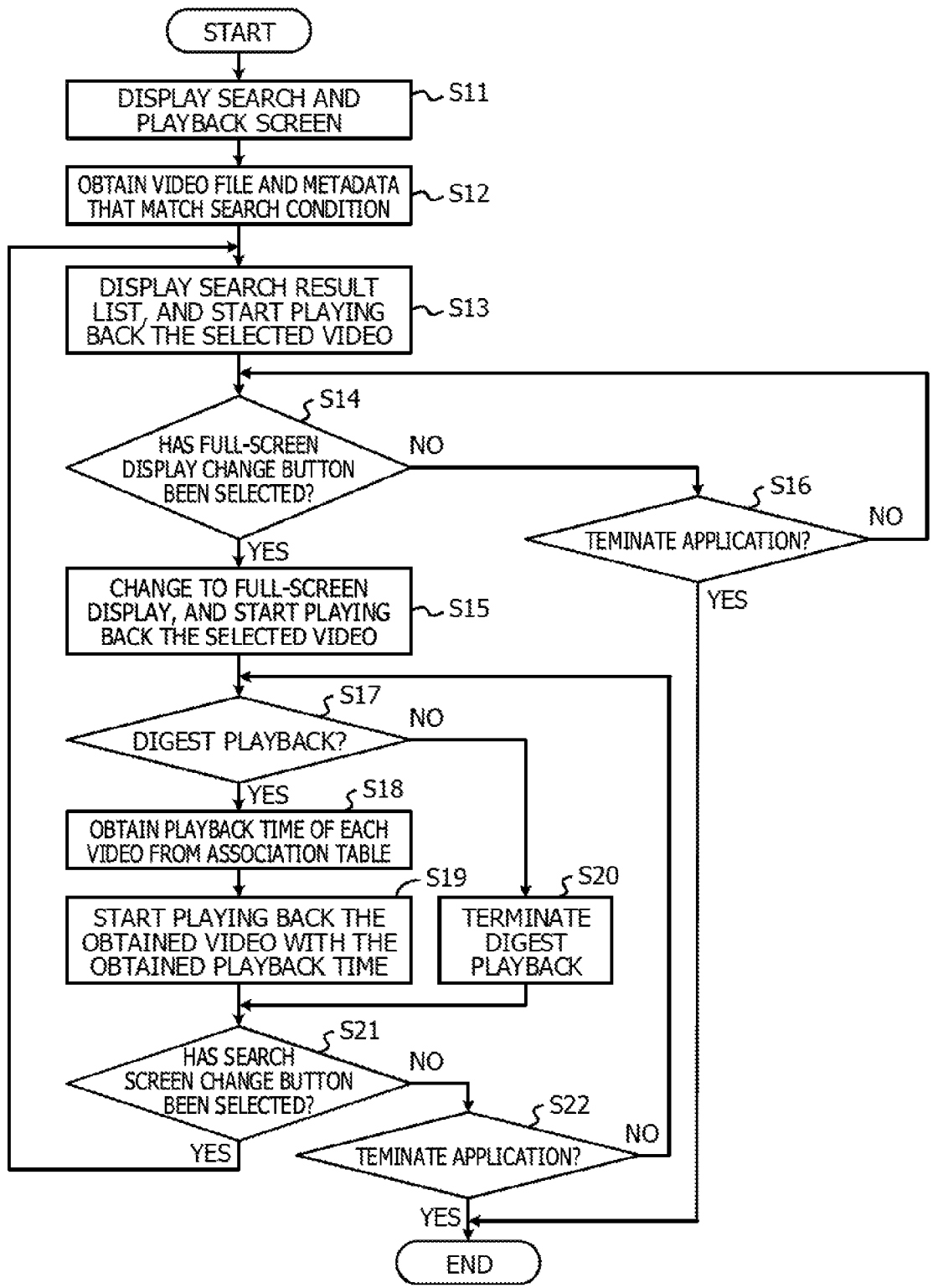
FIG. 7 is a flowchart illustrating an example of playback control processing in the present embodiment.

Next, a description will be given of operation of the playback control device 10 according to the present disclosure. When an application provided by the playback control device 10 is started, the playback control processing illustrated in FIG. 7 is performed in the playback control device 10.

In step S11, the acquisition unit 11 displays, for example, a search and playback screen 30 as illustrated in FIG. 3 on the display device 54. A user sets a search condition of the pitching scene to be viewed in the search condition specification area 31 of the search and playback screen 30, and selects the search button 32.

In step S12, when the acquisition unit 11 detects that the user has selected the search button 32, the acquisition unit 11 transmits the search condition specified in the search condition specification area 31 to the distribution server 20 so as to request distribution of a video. The acquisition unit 11 then acquires the video file 21 and the metadata 22 that are distributed from the distribution server 20.

Next, in step S13, the acquisition unit 11 displays a list of the search results in the search result list display area 33 in a selectable state of each search result based on the acquired metadata 22. The acquisition unit 11 then displays the search result selected by the user in a display mode different from that of the other search results. Also, the playback control unit 12 identifies a pitching scene indicated by the selected search result out of the video file 21 acquired by the acquisition unit 11 based on the metadata 22 corresponding to the search results selected in the search result list display area 33. The playback control unit 12 then starts playing back the video of the identified pitching scene in the video playback area 34. In this regard, the playback control unit 12 plays back the video of the pitching scene indicated by the predetermined search result (for example, the beginning search result in the search result list) until the user selects any one of the search results.

Also, while the video that has started playing back in this step is being played back, if any one of the buttons is selected from the playback control button group 35, the playback control unit 12 performs playback control on the video being played back in accordance with the selected button. Also, if another search result is selected from the search result list during the playback of the video that has been started playing back in this step, the playback control unit 12 changes the video being played back to a video of the pitching scene indicated by a newly selected search result, and starts playing back the video.

In step S13 described above, when the video starts to play back in the video playback area 34, the processing proceeds to the next step S14, and the playback control unit 12 determines whether or not the full-screen change button 36 is selected by the user in the search and playback screen 30. If the full-screen change button 36 has been selected, the processing proceeds to step S15, else if the full-screen change button 36 has not been selected, the processing proceeds to step S16.

In step S15, the playback control unit 12 changes the screen to be displayed on the display device 54 from the search and playback screen 30 to the full screen display 40 as illustrated in FIG. 4, for example. The playback control unit 12 then starts playing back the video file 21 including the pitching scene indicated by the search result selected in the search result list display area 33 of the search and playback screen 30 in the video playback area 41.

On the other hand, in step S16, the playback control unit 12 determines whether or not a command to instruct to terminate the application has been input so as to determine whether or not to terminate the application. If the application is not to be terminated, the processing returns to step S14, whereas if the application is to be terminated, the playback control processing is terminated.

While the video that has been started in the video playback area 41 in step S15 described above is being played back, the processing proceeds to the next step S17, and the playback control unit 12 determines whether or not the digest playback button 45 has been selected. If the digest playback button 45 has been selected, the processing proceeds to step S18, whereas if the digest playback button 45 has not been selected, the processing proceeds to step S20.

In step S18, the playback control unit 12 obtains information of the "result" included in the metadata 22 corresponding to each of the search results included in the search result list displayed in the search result list display area 33 of the search and playback screen 30. The playback control unit 12 then refers to the association table 16, and obtains the playback time of the video of each pitching scene in accordance with the "result" of the pitching scene indicated by each search result.

Next, in step S19, the playback control unit 12 plays back each video in sequence in accordance with the obtained playback time from the video of the pitching scene illustrated by the beginning search result included in the search result list that is displayed in the search result list display area 33. Also, the playback control unit 12 displays the playback gauge 46 with the digest playback.

In this regard, the processing in steps S18 and S19 described above may be performed for each video corresponding to the search results included in the search result list, or may be performed once for all the search results included in the search result list. That is to say, in the former case, each time one playback time of the video corresponding to the search result is obtained in step S18, the processing proceeds to step S19, and playback of the video is started. In the latter case, the playback times of the videos corresponding to all the search results included in the search result list are obtained in step S18, and then the processing proceeds to step S19 to start playing back each of the videos.

On the other hand, in step S20, the playback control unit 12 terminates the digest playback, and continues playing back the video file 21 including the pitching scene currently being played back in the video playback area 41. In this regard, if the digest playback has not been performed when the processing proceeds to this step, the video file 21 that has started playing back in step S15 continues to be played back, and thus this step is skipped.

In this regard, if any one of the buttons from the playback control button group 42 is selected while the video that has started or that continues to be played back in step S15, S19, and S20, the playback control unit 12 performs playback control on the video being played back in accordance with the selected button. Also, it is assumed that the previous video button 43 or the next video button 44 is selected when the video is started or continues to play back in step S15, S19, and S20. In this case, the playback control unit 12 changes the video being played back to the video of the pitching scene indicated by the previous search result or the next search result and starts the playback. When the previous video button 43 or the next video button 44 is selected at the time of digest playback, if the playback time of the video of the pitching scene indicated by the previous search result or the next search result has not been obtained, the playback time is obtained and then the video is changed. If any one of the buttons of the playback control button group 42, the previous video button 43, or the next video button 44 is operated during the digest playback, the playback control unit 12 continues to perform digest playback control after the end of the button operation.

While the video that has started or that continues to be played back in step S19, step S15, or step S20 in the video playback area 41 is being played back, the processing proceeds to next step S21, and the playback control unit 12 determines whether or not the search and playback screen change button 47 has been selected. If the search and playback screen change button 47 has been selected, the processing returns to step S13. In this regard, if the user returns to the search and playback screen 30, and specifies a new search condition, the processing returns to step S12. On the other hand, if the search and playback screen change button 47 has not been selected, the processing proceeds to step S22.

In step S22, the playback control unit 12 determines whether or not to terminate the application. If the application is not to be terminated, the processing returns to step S17. If the determination result in step S17 is the same as that of the previous time, steps S18 and S19, or step S19 is skipped, and the processing proceeds to step S21. If the application is to be terminated, the playback control processing is terminated.

As described above, with the playback control device according to the present embodiment, when digest playback is performed on the videos of a plurality of pitching scenes that match the search condition, the playback time of the video of the pitching scene is determined in accordance with the time depending on the result of the pitching scene. Thereby, it is possible to perform digest playback in a suitable playback time for each video. For example, if the result is strike out, it is possible to change the video to the next video in a relatively shorter time, and if the result is a three-base hit, the video is played back for a relatively longer time, and the video is changed to the next video, or the like.

Figure 8:
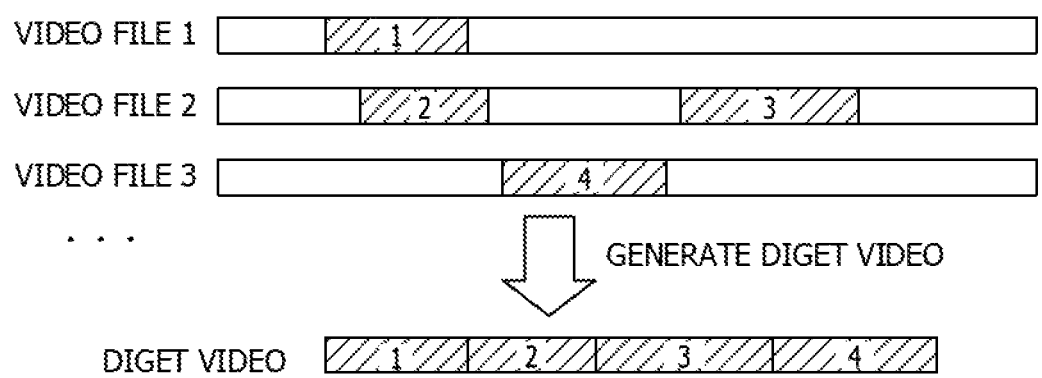
FIG. 8 is a diagram for explaining a case of extracting a plurality of desired scenes to generate a digest video.
Figure 9:
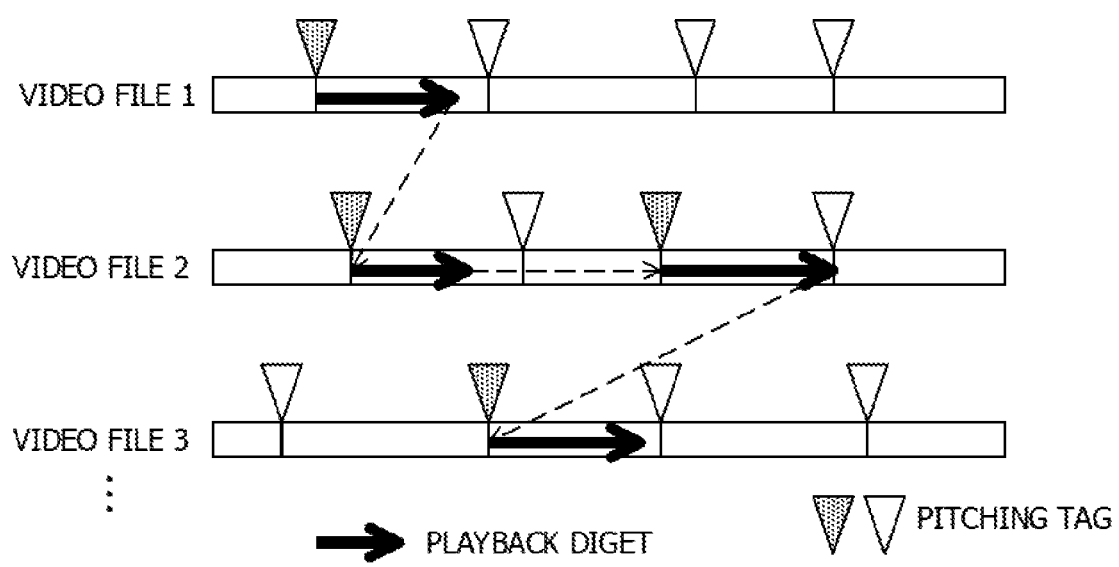
FIG. 9 is a diagram for explaining digest playback in the present embodiment.

Also, if the videos of a plurality of desired scenes are to be viewed in a digest version, for example, as illustrated in FIG. 8, it is thought that there is a method of creating another digest video by extracting a plurality of desired scenes from the individual video files and connecting the desired scenes. However, with the present embodiment, as illustrated in FIG. 9, a video file is provided with a pitching tag (in FIG. 9, denoted by an inverted triangle mark) for each pitching scene, and thus a desired pitching scene is searched using this pitching tag as a starting point. In the example in FIG. 9, a pitching tag denoted by a shaded inverted triangle mark represents a pitching tag (hereinafter referred to as a "target pitching tag") that indicates the start position of the searched pitching scene. If digest playback is performed then, playback ought to be started using the frame provided with this target pitching tag as the starting point. When the playback has reached the playback time obtained from the association table, the video ought to be changed to a video having a pitching scene that starts from the frame given the next target pitching tag. That is to say, another video does not have to be created separately. Also, if a search condition is changed, only the target pitching tag is changed, and thus it is possible to carry out various digest playback flexibly and easily.

In this regard, in the above-described embodiment, a description has been given of the case of setting the playback time of the video of each pitching scene subjected to be digest playback to the time in accordance with the result of the pitching scene. However, the present disclosure is not limited to this. For example, as illustrated in FIG. 10, information that indicates the running ability of a player to be identified in the "batter" field is also included in the metadata 22A. In the case where the time taken for the play as a result is influenced by the running ability of the batter, as illustrated in FIG. 11, the playback time corresponding to the results ought to be determined for each running ability of the batter in the association table 16A. Also, it is thought that even if a plurality of plays brings the same result, the play time differs depending on the runner and the count state in the pitching scene. Accordingly, the playback time may be determined differently for each "result" and a combination of "count" and "runner".

Also, in the above-described embodiment, a description has been given of the case where if digest playback is not performed, the video file 21 including the pitching scene indicated by the search result selected from the search result list is continued to be played back in the video playback area 41 of the full screen display 40. However, the present disclosure is not limited to this playback method. If the playback of a section separated by a pitching tag of the video of the pitching scene indicated by a certain search result is terminated, the video may be changed to that of the pitching scene indicated by the next search result. In this case, when the video file 21 and the metadata 22 that match the search condition is obtained from the distribution server 20, the playback time of the section separated by the pitching tags ought to be included in the metadata 22 and then obtained. Alternatively, information of all the pitching tags regarding the video file may be obtained in advance, and at the time of reaching the frame given the next pitching tag while the video is being played back, the video may be changed to that of the pitching scene indicated by the next search result.

Also, in the above-described embodiment, a description has been given of the case of performing digest playback of the pitching scene of a baseball game video as a sport video. However, the present disclosure is not limited to this. For example, a time-at-bat tag may be given to a breakpoint for each one time at bat, and digest playback for each time at-bat may be performed. Also, it is also possible for the present disclosure to apply to the video of a sport other than baseball. For example, in a soccer game video, tags may be given to the places of the play that indicate a throw-in, a corner kick, a play restart time after a foul, at the inversion time of offense and defense, or the like as a place that indicates breakpoints of a play. Next, information regarding the play, for example, a shot, a dribble, a pass, a goal, or the like may be given to each section separated by the tags. Also, if such information regarding a play is associated with suitable playback time and stored in an association table, it is possible to perform digest playback in the same manner as the above-described embodiment.

Also, in the above, a description has been given of the mode in which the playback control program 60 is stored (installed) in the storage unit 53 in advance. However, it is possible to provide the playback control program 60 that is stored in a storage medium, such as a CD-ROM, a DVD-ROM, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a playback control program that causes a computer to perform a process, the process comprising:
    specifying a plurality of partial videos extracted from a sport video, each of the plurality of partial videos being associated with information indicating a playback start positions and information on a content of sports play indicated by each of the plurality of partial videos;
    determining a plurality of playback times from the playback start position for each of the plurality of partial videos based on the information on the content corresponding to each of the plurality of partial videos and based on relation information that associates each of a plurality of contents of sports play with playback times; and
    playing back the plurality of partial videos based on the plurality of determined playback times.

2. The non-transitory computer-readable storage medium according to claim 1,
    wherein the information on the content of sports play includes a result of the sports play.

3. The non-transitory computer-readable storage medium according to claim 2,
    wherein the relation information includes combinations of the result of the play and the content of sports play other than the result of the sports play associated with playback times.

4. The non-transitory computer-readable storage medium according to claim 3,
    wherein the content of sports play other than the result of the sports play includes characteristics of a player involved in the sports play; and
    playback times are different respectively according to the characteristics.

5. The non-transitory computer-readable storage medium according to claim 1, wherein the process comprises:
    changing between a case of continuously playing back the selected plurality of partial videos by the playback time in accordance with the relation information, and a case of playing back whole of the selected plurality of partial videos.

6. The non-transitory computer-readable storage medium according to claim 1, wherein the process comprises:
    displaying a display component indicating a playback time and a progress of the playback for each of the selected plurality of partial videos when the selected plurality of partial videos is continuously played back.

7. The non-transitory computer-readable storage medium according to claim 1,
    wherein the sport is baseball; and
    wherein the playback start positions are predetermined positions corresponding to a start of pitching by a pitcher; and
    wherein the information on the content is a result of batting for the pitching.

8. The non-transitory computer-readable storage medium according to claim 1, wherein the process further comprises:
    accepting a search condition;
    transmitting a search request in accordance with the accepted search condition to an external device;
    obtaining one or a plurality of video data provided with information indicating a playback start place, and a type of partial video corresponding to a playback start part in accordance with the search request from the external device; and
    obtaining the plurality of partial videos extracted from the sport video.

9. A playback control device comprising:
    a memory; and
    a processor coupled to the memory and the processor configured to:
        specify a plurality of partial videos extracted from a sport video, each of the plurality of partial videos being associated with information indicating a playback start positions and information on a content of sports play indicated by each of the plurality of partial videos;
        determine a plurality of playback times from the playback start position for each of the plurality of partial videos based on the information on the content corresponding to each of the plurality of partial videos and based on relation information that associates each of a plurality of contents of sports play with playback times; and
        play back the plurality of partial videos based on the plurality of determined playback times.

10. A playback control method executed by a computer, the playback control method comprising:
    specifying a plurality of partial videos extracted from a sport video, each of the plurality of partial videos being associated with information indicating a playback start positions and information on a content of sports play indicated by each of the plurality of partial videos;
    determining a plurality of playback times from the playback start position for each of the plurality of partial videos based on the information on the content corresponding to each of the plurality of partial videos and based on relation information that associates each of a plurality of contents of sports play with playback times; and
    playing back the plurality of partial videos based on the plurality of determined playback times.

* * * * *